(12) United States Patent
Iliev et al.

(10) Patent No.: US 8,725,834 B2
(45) Date of Patent: May 13, 2014

(54) ACCESS OF RESOURCES BY WAY OF HYPERTEXT TRANSFER PROTOCOL

(75) Inventors: Ivaylo Iliev, Sofia (BG); Vencislav Dimitrov, Pernik (BG)

(73) Assignee: SAP AG, Walldorf (DE)

( * ) Notice: Subject to any disclaimer, the term of this patent is extended or adjusted under 35 U.S.C. 154(b) by 96 days.

(21) Appl. No.: 13/422,681

(22) Filed: Mar. 16, 2012

(65) Prior Publication Data

US 2013/0246646 A1 Sep. 19, 2013

(51) Int. Cl.
*G06F 15/16* (2006.01)
*G06F 12/00* (2006.01)

(52) U.S. Cl.
USPC .......................................... 709/217; 709/218

(58) Field of Classification Search
USPC .......................... 709/217–219, 223–229, 250
See application file for complete search history.

(56) References Cited

U.S. PATENT DOCUMENTS

| | | | | |
|---|---|---|---|---|
| 6,654,796 B1* | 11/2003 | Slater et al. | ................... | 709/220 |
| 6,895,433 B1* | 5/2005 | Slater et al. | ................... | 709/220 |
| 6,912,569 B1* | 6/2005 | Sharma et al. | ................ | 709/223 |
| 7,600,030 B2* | 10/2009 | Chintalapati et al. | ......... | 709/230 |
| 7,797,376 B1* | 9/2010 | Desai | ............................ | 709/203 |
| 8,375,124 B1* | 2/2013 | Schwartz | ....................... | 709/224 |
| 8,438,295 B2* | 5/2013 | Shukla et al. | ................ | 709/230 |
| 2005/0138426 A1* | 6/2005 | Styslinger | ..................... | 713/201 |
| 2008/0319759 A1* | 12/2008 | Da Palma et al. | .......... | 704/270.1 |
| 2010/0095272 A1* | 4/2010 | Shukla et al. | ................ | 717/117 |
| 2011/0302316 A1* | 12/2011 | Chou et al. | .................... | 709/228 |
| 2012/0054594 A1* | 3/2012 | Isaacson et al. | ............. | 715/230 |
| 2012/0278473 A1* | 11/2012 | Griffiths | ....................... | 709/224 |

* cited by examiner

*Primary Examiner* — Zarni Maung
(74) *Attorney, Agent, or Firm* — Schwegman, Lundberg & Woessner, P.A.

(57) ABSTRACT

In an embodiment, a method is provided for accessing a resource. In this method, a HTTP request that defines an operation to be performed on an identified resource is received. The HTTP request is then parsed to extract an operation parameter from a header of the HTTP request. The HTTP request is executed based on the operation parameter to generate a result, and the result of the execution of the HTTP request is returned in an HTTP response.

20 Claims, 6 Drawing Sheets

ACCESS OF RESOURCES BY WAY OF HYPERTEXT TRANSFER PROTOCOL

FIELD

The present disclosure relates generally to data access. In an embodiment, the disclosure relates to access of resources by way of Hypertext Transfer Protocol.

BACKGROUND

In general, Hypertext Transfer Protocol (HTTP) is used to request and transmit resources (e.g., Webpages and Webpage components) over the Internet or other computer networks. For example, resources can be retrieved by invoking a GET method that retrieves whatever resources identified by an HTTP request. In another example, resources can be stored by invoking a PUT method that requests the storage of resources included in an HTTP request.

HTTP is a popularly-used protocol because HTTP has many useful built-in features, such as automatic authentication, and is platform independent. However, with use of HTTP to access resources, the access features built into HTTP can be rather limited.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Figure 1:
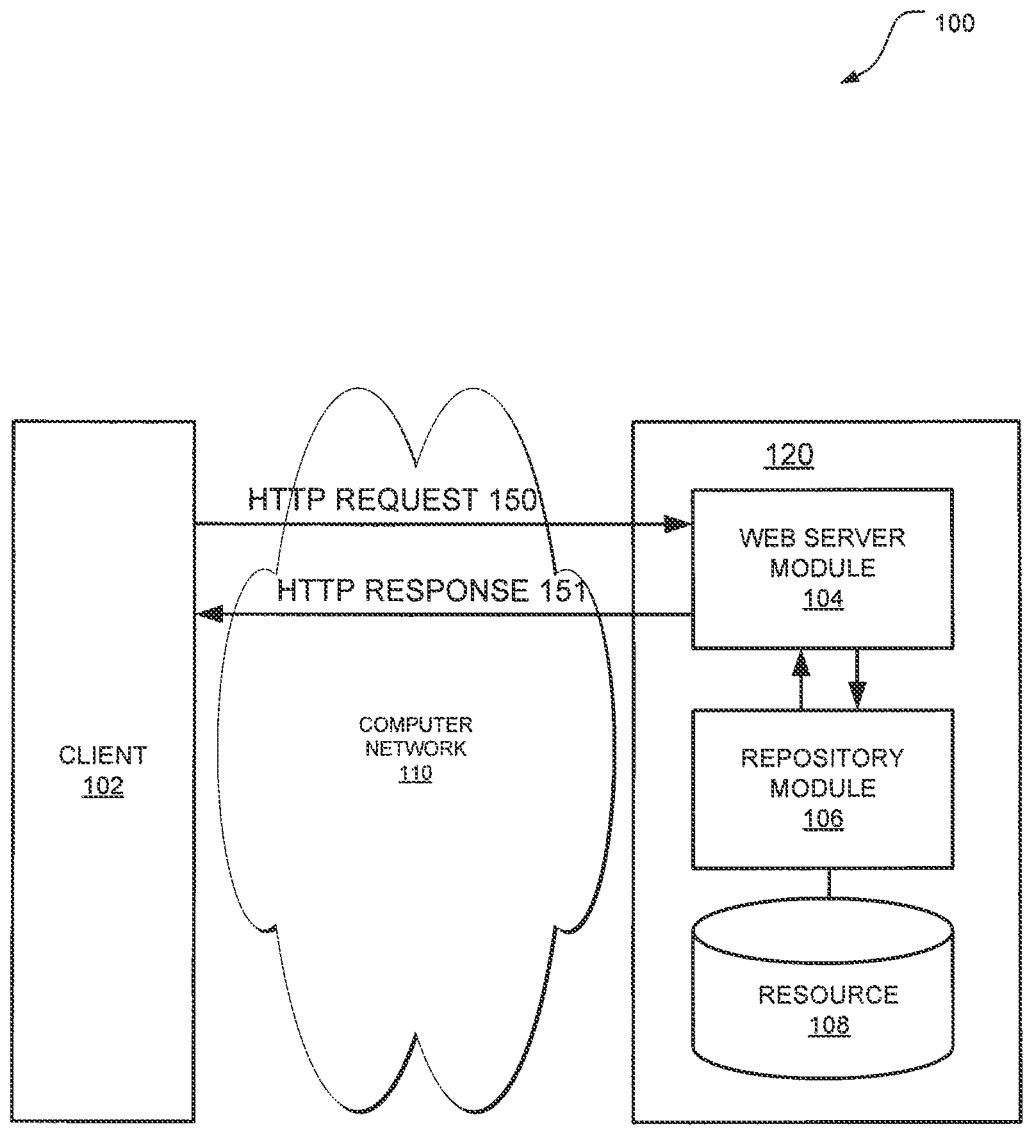
FIG. 1 depicts a block diagram of a system, consistent with one embodiment, for accessing resources by way of HTTP.

FIG. 1 depicts a block diagram of a system 100, consistent with one embodiment, for accessing resources by way of HTTP. The system 100 includes a client computing device 102 that is in communication with a server computing device 120. The client computing device 102 is configured to host a variety of different applications, such as Web browsers, sales order applications, and other applications. The server computing device 120 is configured to host a Web server module 104 and a repository module 106, and store various resources 108. Generally, the Web server module 104 hosts and serves resources 108 to client computing device 102. Examples of the Web server module 104 include Apache HTTP server, Microsoft Internet Information Services, and SAP NetWeaver Application Server. It should be appreciated that a "resource" (e.g., resources 108) is a chunk of information that can be addressed or identified by a uniform resource locator (URL). A common type of resource 108 is a file, but a resource 108 may also be a dynamically-generated query result, an output of a Common Gateway Interface (CGI) script, or a document.

In this example, the Web server module 104 is in communication with the repository module 106 that is configured to access resources 108 stored in one or more storage devices. In particular, the client computing device 102 initially opens an HTTP connection to the server computing device 120 and transmits an HTTP request 150 to the server computing device 120. An "HTTP request," such as the HTTP request 150, refers to an HTTP message requesting information or operation to be performed. Examples of such an HTTP request 150 include "GET," "PUT," "DELETE," or other requests. It should also be appreciated that "HTTP" refers to all variants of HTTP, such as HTTP with Secure Sockets Layer (HTTPS).

Upon receipt of the HTTP request 150, the repository module 106 executes the HTTP request 150 and returns the result of the execution to the client computing device 102 in an HTTP response 151. An "HTTP response" (e.g., HTTP response 151) refers to an HTTP message generated in response to the HTTP request 150. The HTTP response 151 may include the resource 108 that was requested by the HTTP request 150. As explained in detail below, the repository module 106 executes the HTTP request 150 based on a particular operation parameter that is encapsulated in the HTTP request 150.

It should be appreciated that the server computing device 120 may include fewer, more, or different modules apart from those shown in FIG. 1. For example, in another embodiment, the repository module 106 may be integrated in the Web server module 104. In yet another embodiment, the server computing device 120 can also host an application server module (not shown in FIG. 1). An application server module is an application server that delivers applications to client computing device 102. The application server module may handle, for example, business logic and data access of the applications hosted on the client computing device 102. Examples of the application server module include a JAVA application server, an Apache server, and an Advanced Business Application Programming (ABAP) Application Server.

Figure 2:
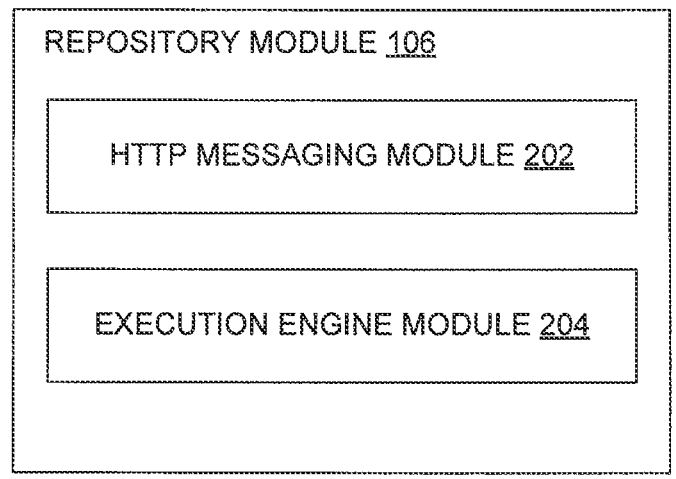
FIG. 2 is a block diagram depicting a repository module, in accordance with an embodiment.

FIG. 2 is a block diagram depicting a repository module 106, in accordance with an embodiment. The repository module 106 may be deployed in the form of for example, a server computing device. For example, the repository module 106 may be included in the system 100 depicted in FIG. 1 where the repository module 106 may form a part of the server computing device 120. In various embodiments, the repository module 106 may be used to implement computer programs, logic, applications, methods, processes, or software to access resources by way of HTTP, as described in more detail below.

In reference to FIG. 2, this embodiment of the repository module 106 includes an HTTP messaging module 202 and execution engine module 204. The HTTP messaging module 202 generally handles communication to and from other computing devices and/or modules by way of HTTP. For example, in a Netweaver ABAP Application Server, the HTTP messaging module 202 can be a part of a communication layer that provides server side communication on top of the HTTP/HTTPS protocol. The HTTP messaging module 202 may also, for example, provide a standard interface for communication with other request-response based protocols. Additionally, the HTTP messaging module 202 can parse HTTP messages to extract operation parameters, as explained in detail below.

The execution engine module 204 is configured to execute the HTTP request to generate a result. That is, the execution engine module 204 executes various HTTP methods. For example, the execution engine module 204 can execute a GET method, which retrieves whatever resource that is identified by the HTTP request. In another example, the execution engine module 204 can execute a DELETE method, which requests that the server computing device delete the resource identified by the HTTP request. In an embodiment, the execution engine module 204 can execute the HTTP methods based on operation parameters extracted from HTTP messages, as explained in more detail below.

It should be appreciated that in other embodiments, the repository module 106 may include fewer or more modules apart from those shown in FIG. 2. For example, in an alternate embodiment, the HTTP messaging module 202 can be excluded from the repository module 106. The modules 106, 202, and 204 may be in the form of software that is processed by a processor. In another example, as explained in more detail below, the modules 106, 202, and 204 may be in the form of firmware that is processed by application specific integrated circuits (ASIC), which may be integrated into a circuit board. Alternatively, the modules 106, 202, and 204 may be in the form of one or more logic blocks included in a programmable logic device (for example, a field programmable gate array). The described modules 106, 202, and 204 may be adapted, and/or additional structures may be provided, to provide alternative or additional functionalities beyond those specifically discussed in reference to FIG. 2. Examples of such alternative or additional functionalities will be discussed in reference to the flow diagrams discussed below.

Figure 3:
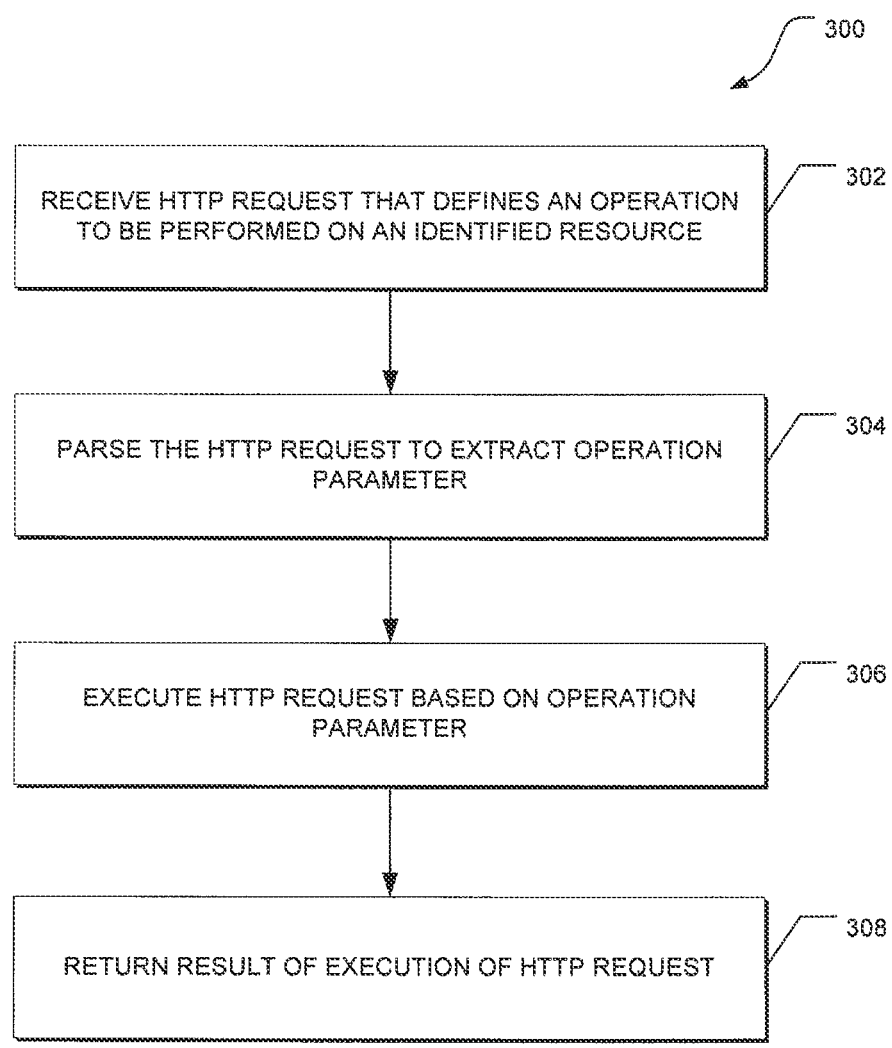
FIG. 3 depicts a flow diagram of a general overview of a method, in accordance with an embodiment, for accessing resources by way of HTTP.

FIG. 3 depicts a flow diagram of a general overview of a method 300, in accordance with an embodiment, for accessing resources by way of HTTP. In an example embodiment, method 300 may be implemented by the repository module 106 and employed in the server computing device 120 depicted in FIG. 1. In reference to FIG. 3, the repository module receives, at 302, an HTTP request that defines an operation to be performed on a resource identified in the HTTP request. Here, the HTTP request is to a resource-oriented Representational State Transfer (RESTful) web service. Generally, REST is a style of software architecture for distributed hypermedia systems, such as the World Wide Web. REST-style architectures comprise client computing devices and server computing devices. As discussed above, client computing devices initiate requests to server computing devices, while server computing devices process requests and return appropriate responses. Requests and responses are built around the transfer of representations of resources. It should be noted that in RESTful architectures, the method information goes into the HTTP method while the scoping information in the URL.

Upon receipt of the HTTP request, the repository module, at 304, parses the HTTP request to extract an operation parameter. As used herein, an "operation parameter" refers to a value that is separate from the input instances for an HTTP method invocation, but which affects how those input instances are processed. The operation parameter can affect the execution of various HTTP methods, such as GET method, DELETE method, PUT method, and other HTTP methods. For example, an operation parameter can define a format (discussed below) to package files in a GET method.

In one embodiment, the operation parameter is stored in the HTTP header of the HTTP request, and the repository module extracts the operation parameter from the HTTP header. An HTTP header field is one or more components of the message header of an HTTP request or HTTP response. The HTTP header field is transmitted after the request or response line, the first line of a message. The HTTP header field is a colon-separated name-value pair in clear-text string format, terminated by a carriage return (CR) and line feed (LF) character sequence. The end of the header fields is indicated by an empty field, resulting in the transmission of two consecutive CR-LF pairs.

After the operation parameter is extracted, the repository module executes, at 306, the HTTP request based on the extracted operation parameter. A result is generated as a result of the execution, and the repository module then returns the result in an HTTP response at 308.

Figure 4:
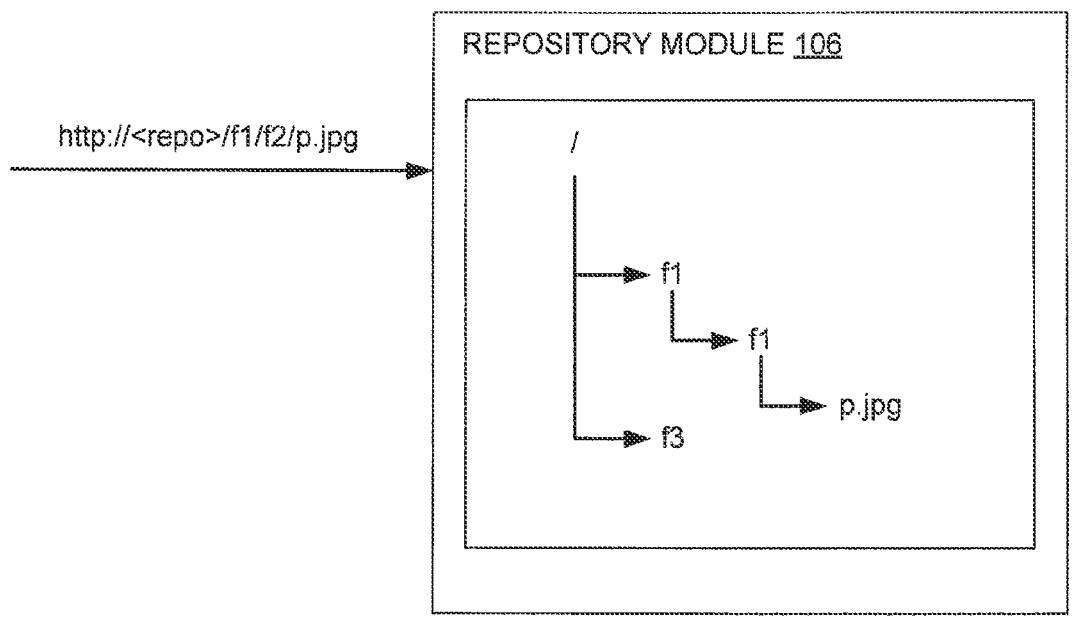
FIG. 4 is a diagram depicting an example of an access operation, in accordance with an example embodiment.

FIG. 4 is a diagram depicting an example of an access operation, in accordance with an example embodiment. Here, the repository module 106 receives an HTTP request "HTTP://<repo>/f1/f2/p.jpg" that requests file along directory path "/f1/f2/p.jpg" stored in a repository. The repository module 106 can answer the HTTP request with an HTTP response having: (1) HTTP status code (e.g., code 200 if everything is OK or code 500 if error occurs); (2) HTTP message body (including resource information, error description); and (3) message content type (including, e.g., text/html for error messages, application/zip for file content).

Additionally, example embodiments also support the use of the GET method to retrieve folders. For example, the HTTP request can be instead "HTTP://<repo>/f1/f2" that requests all files stored in folder "f1." That is, the HTTP request is requesting a resource in the form of a folder, which includes files. In the HTTP response, the repository module 106 returns a list of files from folder "f1." in a particular format. In this embodiment, the operation parameter extracted from the HTTP request header defines a format to package the files. Examples of formats used to package the files include JavaScript Object Notation (JSON), Extensible Markup Language (XML), and Election Markup Language (EML). Accordingly, the use of operation parameters in HTTP messages allows access of files in HTTP similar to file system operations, the features of which are not available in existing, conventional RESTful web services. For example, example embodiments allow the retrieval of folders, but conventional HTTP requests can only retrieve individual files—not folders.

In another embodiment, the HTTP header of the HTTP response can also store a different operation parameter that defines a format to compress the folder. Examples of such formats include ZIP, TAR, 7-ZIP (7z), GNU ZIP (GZIP), and Roshal Archive (RAR). For example, the operation parameter "BatchCommand=zip" will export requested folder as a zip file. With the operation parameter extracted, the repository module 106 can compress the files in the folder according to the format defined in the operation parameter and return the folder (with compressed files) by way of an HTTP response.

Figure 5:
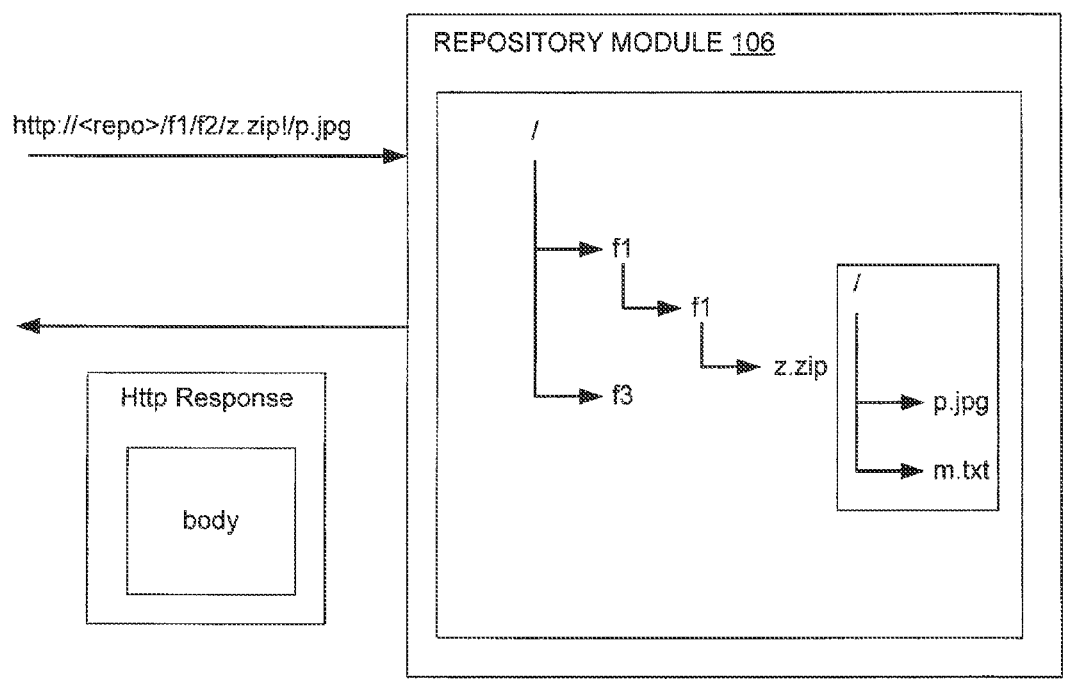
FIG. 5 is a diagram depicting an example of a different access operation, in accordance with an example embodiment.

FIG. 5 is a diagram depicting an example of a different access operation, in accordance with an example embodiment. In this example, the repository module receives an HTTP request "HTTP://<repo>/f1/f2/z.zip!/p.jpg" that requests a file along directory path "/f1/f2/p.jpg" stored in a repository. As depicted in FIG. 5, the "p.jpg" file is stored in a zip file. The "!/name" added to the HTTP request triggers a check that the requested resource is a zip file and the repository module 106 extracts the entry "name" from the zip and returns the name in a body of the HTTP response.

The following Table A lists more example details of the use of GET methods in context of example embodiments:

TABLE A

| HTTP Request | | | | HTTP Response | | |
|---|---|---|---|---|---|---|
| HTTP Method | Body | Header | Sample URL | Return Code | Body | Content-type |
| Get | | | HTTP://<repoURL>/folder1/folder2/item | 200 - if /folder1/folder2/item exists in repository | If "item" is a folder: JSON list of items in the folder | text/html |
| | | | | | if "item" is a file: file content | application/zip |
| | | | | 200 - if /folder1/folder2/item do not exists in repository and there is ".redirectURL" file in any of the parent folders of item or item name is '.redirectURL' | Body of the response received from URL read from ".redirectURL" with added rest of the path from where ".redirectURL" was found (if ".redirectURL" is in /folder1 folder, requested URL will be <read from .redirectURL file>+/folder2/item) | application/zip |
| | | | | 404 - if /folder1/folder2/item do not exists in repository and there is no ".redirectURL" file in any of parent folders of item | | text/html |
| | | | | 403 - If requested resource is outside repository (for example requested path contains ". . ./. . ./") | | |
| | | | | 500 - if error occurs on the server | Error message if available | text/html |
| | | | HTTP://<repoURL>/folder1/folder2/item!/file1 | 200 - if there is a archive with name item1 and in this archive exist entry file1 | file1 content | application/zip |
| Get | | 'BatchCommand= zip' in PRAGMA header | | 200 - if /folder1/folder2/item exists in repository | Zipped content of '/folder1/folder2/item' if it is a folder, METAINF\MANIFEST.MF file contains section with 'Name=JPaasRepository' and property 'Path=/folder1/folder2/item' | application/zip |

In addition, the repository module 106 can also process DELETE methods. Here, in one embodiment, if some files cannot be deleted, the repository module 106 puts all the file names in the body of the HTTP response. The following Table B lists more example details of the use of DELETE methods in context of example embodiments.

embodiment, the operation parameter can also define an option to overwrite an existing file with the compressed file that is located in the same directory path. In yet another embodiment, the operation parameter can define an option to create a directory path to store the compressed file if the directory path is absent. For example, a PUT method creates a file with path taken from URL HTTP://<repo>/folder1/file1 will create folder "folder 1" and file "file 1" if such a directory path is absent.

The following Table C lists more example details of the use of PUT methods in context of example embodiments.

TABLE B

| HTTP Request | | | | HTTP Response | | |
|---|---|---|---|---|---|---|
| HTTP Method | Body | Header | Sample URL | Return Code | Body | Content Type |
| Delete | | | HTTP://<repoURL>/folder1/folder2/item | 200 - if /folder1//item was deleted successfully (if item is folder all subfolders will be deleted) | | text/html |
| | | | | 403 - if is requested resource outside repository (for example requested path contains ".../.../") | | |
| | | | | 500 - If there is a problem with delete operation | comma delimited list of items that are not deleted | text/html |

In addition to GET and DELETE methods, the repository module can also process PUT methods. It should be noted that the PUT method requests that an enclosed resource (e.g., file) in an HTTP request to be stored. In one embodiment, the operation parameter extracted from the header of the HTTP request can define a command to decompress a compressed file included in the body of the HTTP request. In another

TABLE C

| HTTP Request | | | | HTTP Response | | |
|---|---|---|---|---|---|---|
| HTTP Method | Body | Header | Sample URL | Return Code | Body | Content-Type |
| Put | file content | Properties 'PathExists= true/false' and 'Overwrite= true/false' set in PRAGMA header ( see client API 'upload' method for details) | HTTP://<repoURL>/folder1/folder2/item | 201 - if /folder1/folder2/item was successfully written in repository | | text/html |
| | | | | 200 - if /folder1/folder2/item was successfully updated | | text/html |
| | | | | 403 - if requested resource is outside repository (for example requested path contains ".../.../") | | |
| | | | | 404 - if path do not exists in repository and provided via 'PathExists' path do not exists | | |
| | | | | 409 - if folder with the same name already exists | Error message if available | text/html |
| | | | | 412 - if 'Overwrite' property set to false and file already exists | | |
| | | | | 500 - if error occurs | Error message if available | text/html |
| | | 'BatchCommand= unzip' | | 200 - if unzip operation has finished successfully. If exists old folder is deleted | | text/html |
| | | | | 500 - error occurs | Error message if available | text/html |

Figure 6:
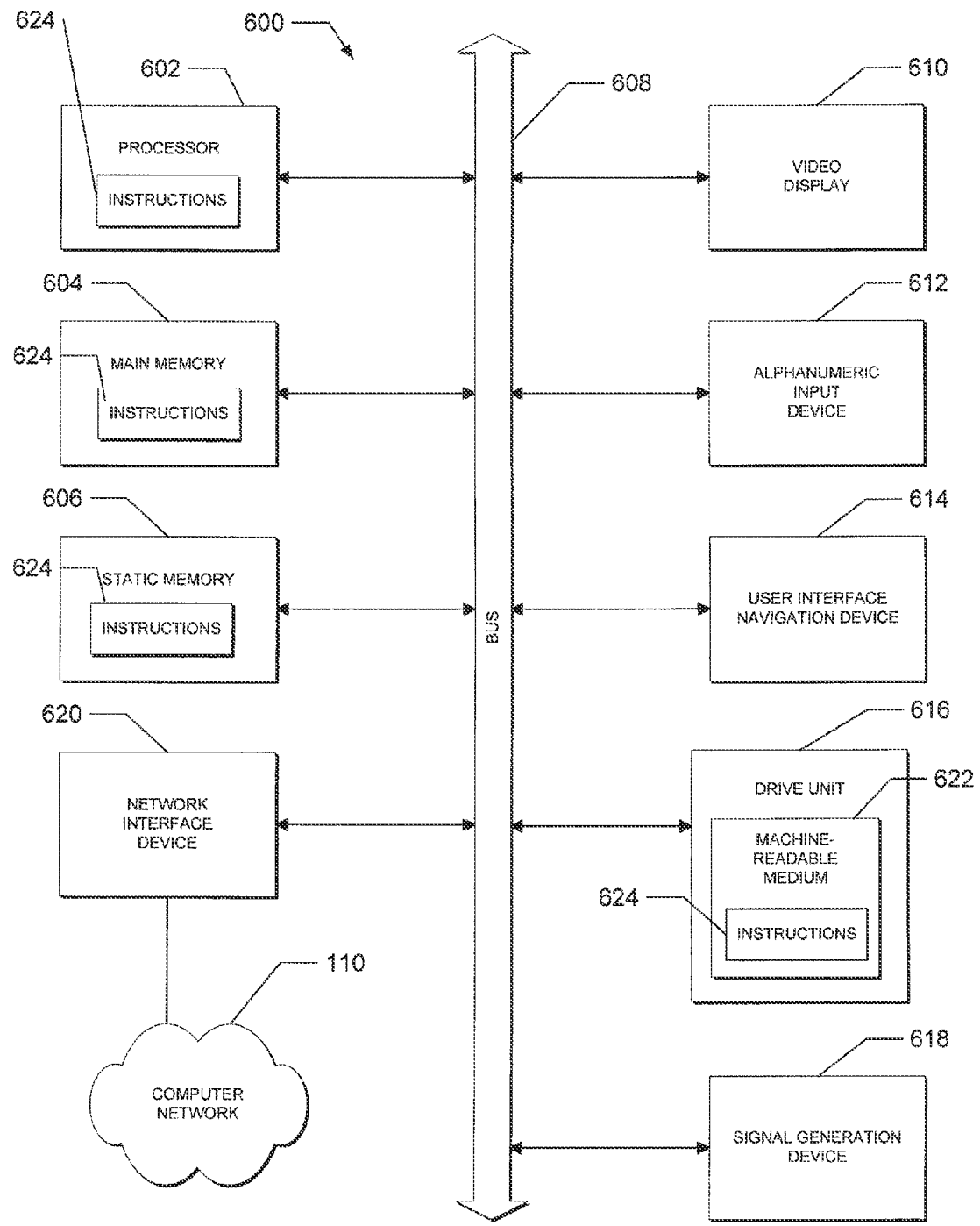
FIG. 6 depicts a block diagram of a machine in the example form of a processing system within which may be executed a set of instructions for causing the machine to perform any one or more of the methodologies discussed herein.

FIG. 6 depicts a block diagram of a machine in the example form of a processing system 600 within which may be executed a se of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 600 includes a processor 602 e.g., a central processing unit (CPU), a graphics processing unit (GPU) or both), a main memory 604 (e.g., random access memory), and static memory 606 (e.g., static random-access memory), which communicate with each other via bus 608. The processing system 600 may further include video display unit 610 (e.g., a plasma display, a liquid crystal display (LCD) or a cathode ray tube (CRT)). The processing system 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620.

The disk drive unit 616 (a type of non-volatile memory storage) includes a machine-readable medium 622 on which is stored one or more sets of data structures and instructions 624 (e.g., software) embodying or utilized by any one or more of the methodologies or functions described herein. The data structures and instructions 624 may also reside, completely or at least partially, within the main memory 604 and/or within the processor 602 during execution thereof by processing system 600, with the main memory 604 and processor 602 also constituting machine-readable, tangible media.

The data structures and instructions 624 may further be transmitted or received over a computer network 110 via network interface device 620 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 600) or one or more hardware modules of a computer system (e.g., a processor 602 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 602 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 602 configured using software, the general-purpose processor 602 may be configured as respective different hardware modules at different times. Software may accordingly configure a processor 602, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 602 or processor-implemented modules. The performance of certain of the operations may be distributed among the one or more processors 602, not only residing within a single machine, but deployed across a number of machines. In some example embodiments, the processors 602 may be located in a single location (e.g., within a home environment, an office environment or as a server farm), while in other embodiments the processors 602 may be distributed across a number of locations.

While the embodiment(s) is (are) described with reference to various implementations and exploitations, it will be understood that these embodiments are illustrative and that the scope of the embodiment(s) is not limited to them. In general, techniques for access of resources by way of HTTP may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of accessing a resource, the method comprising:
    receiving a Hypertext Transfer Protocol (HTTP) request that defines an operation to be performed on an identified resource;
    parsing the HTTP request to extract an operation parameter from a header of the HTTP request, the HTTP request including a first line that invokes an HTTP method corresponding to the HTTP request and a second line that includes the header of the HTTP request;
    executing the HTTP request based on the operation parameter to generate a result, the operation parameter modifying an invocation of the HTTP request; and
    returning, in an HTTP response, the result of the execution of the HTTP request.

2. The method of claim 1, wherein the HTTP request is to a resource-oriented Representational State Transfer (RESTful) web service.

3. The method of claim 1, wherein the HTTP request is a GET method, wherein the identified resource is a folder that includes files, and wherein the operation parameter defines a format to package the files.

4. The method of claim 1, wherein the HTTP request is a GET method, wherein the identified resource is a folder that includes files, and wherein the operation parameter defines a format to compress the files.

5. The method of claim 1, wherein the HTTP request is a PUT method to store a compressed file included in a body of the HTTP request, and wherein the operation parameter defines a command to decompress the compressed file.

6. The method of claim 1, wherein the HTTP request is a PUT method to store a compressed file included in a body of the HTTP request, and wherein the operation parameter defines an option to overwrite an existing file with the compressed file located in same directory path.

7. The method of claim 1, wherein the HTTP request is a PUT method to store a compressed file included in a body of the HTTP request, and wherein the operation parameter defines an option to create a directory path to store the compressed file if the directory path is absent.

8. A non-transitory, machine-readable storage medium that stores instructions, which, when performed by a machine, cause the machine to perform operations comprising:
    receiving a Hypertext Transfer Protocol (HTTP) request that defines an operation to be performed on an identified resource, the HTTP request including a first line that invokes an HTTP method corresponding to the HTTP request and a second line that includes the header of the HTTP request;
    parsing the HTTP request to extract an operation parameter from a header of the HTTP request;
    executing the HTTP request based on the operation parameter to generate a result, the operation parameter modifying an invocation of the HTTP request; and
    returning, in an HTTP response, the result of the execution of the HTTP request.

9. The non-transitory, machine-readable storage medium of claim 8, wherein the HTTP request is to a resource-oriented Representational State Transfer (RESTful) web service.

10. The non-transitory, machine-readable storage medium of claim 8, wherein the HTTP request is a GET method, wherein the identified resource is a folder that includes files, and wherein the operation parameter defines a format to package the files.

11. The non-transitory, machine-readable storage medium of claim 8, wherein the HTTP request is a GET method, wherein the identified resource is a folder that includes files, and wherein the operation parameter defines a format to compress the files.

12. The non-transitory, machine-readable storage medium of claim 8, wherein the HTTP request is a PUT method to store a compressed file included in a body of the HTTP request, and wherein the operation parameter defines a command to decompress the compressed file.

13. The non-transitory, machine-readable storage medium of claim 8, wherein the HTTP request is a PUT method to store a compressed file included in a body of the HTTP request, and wherein the operation parameter defines an option to overwrite an existing file with the compressed file located in same directory path.

14. The non-transitory, machine-readable storage medium of claim 8, wherein the HTTP request is a PUT method to store a compressed file included in a body of the HTTP request, and wherein the operation parameter defines an option to create a directory path to store the compressed file if the directory path is absent.

15. A system comprising:
    a Hypertext Transfer Protocol (HTTP) messaging module having instructions that when executed by at least one processor, cause operations to be performed, the operations comprising:
        receiving an HTTP request that defines an operation to be performed on an identified resource; and
        parsing the HTTP request to extract an operation parameter from a header of the HTTP request, the HTTP request including a first line that invokes an HTTP method corresponding to the HTTP request and a second line that includes the header of the HTTP request;
        returning, in an HTTP response, a result of an execution of the HTTP request; and
    an execution engine module having instructions that when executed by at least one processor, cause operations to be performed, the operations comprising executing the HTTP request based on the operation parameter to generate the result, the operation parameter modifying an invocation of the HTTP request.

16. The system of claim 15, wherein the HTTP request is to a resource-oriented Representational State Transfer (RESTful) web service.

17. The system of claim 15, wherein the HTTP request is a GET method, wherein the identified resource is a folder that includes files, and wherein the operation parameter defines a format to package the files.

18. The system of claim 15, wherein the HTTP request is a PUT method to store a compressed file included in a body of the HTTP request, and wherein the operation parameter defines a command to decompress the compressed file.

19. The system of claim 15, wherein the HTTP request is a PUT method to store a compressed file included in a body of the HTTP request, and wherein the operation parameter defines an option to overwrite an existing file with the compressed file located in same directory path.

20. The system of claim 15, wherein the HTTP request is a PUT method to store a compressed file included in a body of the HTTP request, and wherein the operation parameter defines an option to create a directory path to store the compressed file if the directory path is absent.

\* \* \* \* \*